US011690476B2

(12) United States Patent
Colston et al.

(10) Patent No.: US 11,690,476 B2
(45) Date of Patent: Jul. 4, 2023

(54) DIRECT-CURRENT SOLID-FUEL GRILL

(71) Applicant: Traeger Pellet Grills, LLC, Salt Lake City, UT (US)

(72) Inventors: Michael Colston, Salt Lake City, UT (US); Daniel W. Sluder, Salt Lake City, UT (US); Daniel A. Altenritter, Riverton, UT (US)

(73) Assignee: Traeger Pellet Grills, LLC, Salt Lake City, UT (US)

( * ) Notice: Subject to any disclaimer, the term of this patent is extended or adjusted under 35 U.S.C. 154(b) by 179 days.

(21) Appl. No.: 15/733,638

(22) PCT Filed: Feb. 8, 2019

(86) PCT No.: PCT/US2019/017337
§ 371 (c)(1),
(2) Date: Sep. 22, 2020

(87) PCT Pub. No.: WO2019/157372
PCT Pub. Date: Aug. 15, 2019

(65) Prior Publication Data
US 2021/0361115 A1    Nov. 25, 2021

Related U.S. Application Data

(60) Provisional application No. 62/628,414, filed on Feb. 9, 2018.

(51) Int. Cl.
*A47J 37/07* (2006.01)
(52) U.S. Cl.
CPC ......... *A47J 37/0704* (2013.01); *A47J 37/079* (2013.01); *A47J 37/0754* (2013.01)

(58) Field of Classification Search
CPC ... A47J 37/0704; A47J 37/0754; A47J 37/079
See application file for complete search history.

(56) References Cited

U.S. PATENT DOCUMENTS 2,983,269 A    5/1961   Montesano
5,996,572 A   12/1999   Ilagan
(Continued)

FOREIGN PATENT DOCUMENTS

CN    202897568    4/2013
CN    203560891    4/2014
(Continued)

OTHER PUBLICATIONS

International Search Report from International Application No. PCT/US2019/017337, dated May 23, 2019, 6 pages.
(Continued)

*Primary Examiner* — Alfred Basichas
(74) *Attorney, Agent, or Firm* — TraskBritt

(57) ABSTRACT

A direct-current (DC) solid-fuel grill comprises a direct-current power source and a direct-current auger motor receiving power from the direct-current power source. The DC solid-fuel grill may also comprise a solid-fuel grill component configured to be driven by the direct-current auger motor. A direct-current controller or processor is in communication with the direct-current auger motor. The direct-current controller or processor is configured to provide at least a first signal to the direct-current auger motor causing the solid-fuel grill component to actuate at a first velocity, and a second signal to the direct-current auger motor causing the solid-fuel grill component to actuate at a second velocity.

19 Claims, 4 Drawing Sheets

(56) References Cited

U.S. PATENT DOCUMENTS

| | | | |
|---|---|---|---|
| 6,405,662 B1 † | 6/2002 | Williams | |
| 8,657,485 B2 † | 2/2014 | Neier | |
| 9,759,429 B2 † | 9/2017 | Tucker | |
| 2006/0168984 A1 † | 8/2006 | Myers | |
| 2008/0168977 A1 | 7/2008 | Daud | |
| 2009/0293860 A1 † | 12/2009 | Carlson | |
| 2012/0008457 A1* | 1/2012 | Neier | A01K 5/004 |
| | | | 366/190 |
| 2015/0282668 A1 | 10/2015 | Zhu et al. | |
| 2015/0320259 A1 | 11/2015 | Tucker | |

FOREIGN PATENT DOCUMENTS

| | | |
|---|---|---|
| CN | 106211752 B | 12/2016 |
| CN | 206531083 | 9/2017 |
| GB | 9828105 | 12/1998 |
| GB | 2344743 A | 6/2000 |
| KR | 10-2013-0030423 A | 3/2013 |
| KR | 0030423 A | 3/2013 |
| KR | 10-1347212 † | 1/2014 |

OTHER PUBLICATIONS

International Written Opinion from International Application No. PCT/US2019/017337, dated May 23, 2019, 8 pages.
Chinese First Office Action for Application No. 201980024154.5 dated Aug. 29, 2022, 20 pages with translation.

\* cited by examiner
† cited by third party ially available DC power sources, including, but not limited to, lithium-ion batteries. However, any DC power source may be used. In some cases, DC power source 102 may be rechargeable via an AC power source that can be plugged into a common outlet.

DIRECT-CURRENT SOLID-FUEL GRILL

CROSS-REFERENCE TO RELATED APPLICATIONS

This application is a national phase entry under 35 U.S.C. § 371 of International Patent Application PCT/US2019/017337, filed Feb. 8, 2019, designating the United States of America and published in English as International Patent Publication WO 2019/157372 A1 on Aug. 15, 2019, which claims the benefit under Article 8 of the Patent Cooperation Treaty to U.S. Provisional Patent Application Ser. No. 62/628,414, filed Feb. 9, 2018.

TECHNICAL FIELD

This disclosure relates generally to systems, methods, and devices for grilling and warming food products.

BACKGROUND

Users often prepare food on grilling devices such as pellet grills. Pellet grills may burn various fuels, including wood pellets, in order to heat food within the grill. In some cases, the burning pellets may provide flavor to food within the grill, such as a smoke flavor. Further, a user may be able to select particular types of pellets in order to create particular flavors within the grilled food.

Some pellet grills may include a number of components that require electric power, such as ignition starters, pellet fuel feeding systems, and/or blowers. Users may typically plug the grill into a household or other outlet via a power cord to power the grill using alternating current (AC). Power cords, however, may reduce the portability of the grill. Corded grills may also limit users to using the grill in dry conditions due to safety concerns over exposing the power cord to moisture from rain or snow. Also, fuel pellets, such as wooden pellets, often clog and/or jam fuel feeder systems. Users may have a hard time unclogging the fuel feeder system of a solid-fuel grill and/or cleaning out areas of the grill where soot may accumulate. Accordingly, there are a number of disadvantages in grilling devices and systems that can be addressed.

BRIEF SUMMARY

Embodiments disclosed herein include a direct-current (DC) solid-fuel grill. The DC solid-fuel grill comprises a DC power source and a DC motor receiving power from the DC power source. The DC solid-fuel grill may also comprise a solid-fuel grill component configured to be driven by the DC motor. A DC controller is in communication with the DC motor. The DC controller is configured to provide at least a first signal to the DC motor causing the solid-fuel grill component to actuate at a first velocity and then a second signal to the DC motor causing the solid-fuel grill component to actuate at a second velocity.

Additionally, disclosed embodiments include a method for operating a DC solid-fuel grill. The method comprises receiving, at a DC motor, power from a DC power source. The method also comprises receiving, from a DC controller, a first signal to actuate the DC motor, wherein the first signal causes the DC motor to actuate at a first velocity. In addition, the method comprises driving, with the DC motor, a solid-fuel grill component at the first velocity. Further, the method comprises receiving, from the DC controller, a second signal to actuate the DC motor, wherein the second signal causes the DC motor to actuate at a second velocity. Further still, the method comprises driving, with the DC motor, the solid-fuel grill component at the second velocity.

Further disclosed embodiments include a DC solid-fuel grill that comprises a DC power source and a first DC motor receiving power from the DC power source. A solid-fuel auger is configured to be actuated by the first DC motor. The DC solid-fuel grill also comprises a second DC motor receiving power from the DC power source. A blower is configured to be actuated by the first DC motor. A DC controller is in communication with at least one of the first DC motor or the second direct-current motor. The DC controller is configured to provide at least a first signal to the at least one of the first DC motor or the second direct-current motor causing at least one of the solid-fuel auger or the blower to actuate at a first velocity. The DC controller is then configured to provide a second signal to the at least one of the first DC motor or the second direct-current motor causing the at least one of the solid-fuel auger or the blower to actuate at a second velocity.

Additional features and advantages of exemplary implementations of the present disclosure will be set forth in the description that follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof, which are illustrated in the appended drawings. Understanding that these drawings depict only typical embodiments of the disclosure and are not, therefore, to be considered to be limiting of its scope, the disclosure will be described and explained with additional specificity and detail through the use of the accompanying drawings summarized below.

DETAILED DESCRIPTION

This disclosure relates generally to systems, methods, and devices for grilling and warming food products. In particular, embodiments of this disclosure relate to direct-current (DC) powered pellet grills. For example, a DC-powered solid-fuel grill may comprise a DC power source in communication with one or more DC motors. The one or more DC motors may actuate one or more solid-fuel grill components, such as a blower and/or a pellet auger. As used here, a solid-fuel grill component comprises any electrically powered component within a solid-fuel grill, including, but not limited to, motors, augers, blowers, hot-rods, user interface displays, lights, and sensors. The one or more DC motors may also be capable of selectively actuating the blower and/or the pellet auger at multiple different velocities. For example, the one or more DC motors may actuate the blower at different velocities based upon operating conditions within the pellet grill. In at least one embodiment, the one or more motors may actuate at a negative velocity such that they operate in a reverse direction.

The DC-powered solid fuel grill of the present disclosure provides a number of advantages over the prior art. The DC motors may provide feedback that is capable of sensing when various components are in condition for replacement and notify the user or manufacturer accordingly. The DC motors can power the auger so that a user can easily reverse the auger to clear the fuel pellets clogging the auger feeder system, as well as reverse the blower to clear out ash that can accumulate inside the grilling device. A DC ceramic hot-rod can heat up quickly and also act as a heat sensor. The ceramic hot-rod can thus provide a short pre-heating time of the grill as well as provide for fine-tuned temperature adjustment. Furthermore, the DC power source can eliminate the need for power cords, allowing a user to safely use the grill in wet conditions.

Additionally, in at least one embodiment, a DC solid-fuel grill is capable of being put into a lower-power sleep mode. The DC power source provides efficiency gains with respect to conventional AC power source for low-power sleep modes. Further, DC motors may provide a more ideal torque response than a similar AC motor. DC motors may also provide for a greater resolution of controls for adjusting the velocities and torques of the motors.

Figure 1:
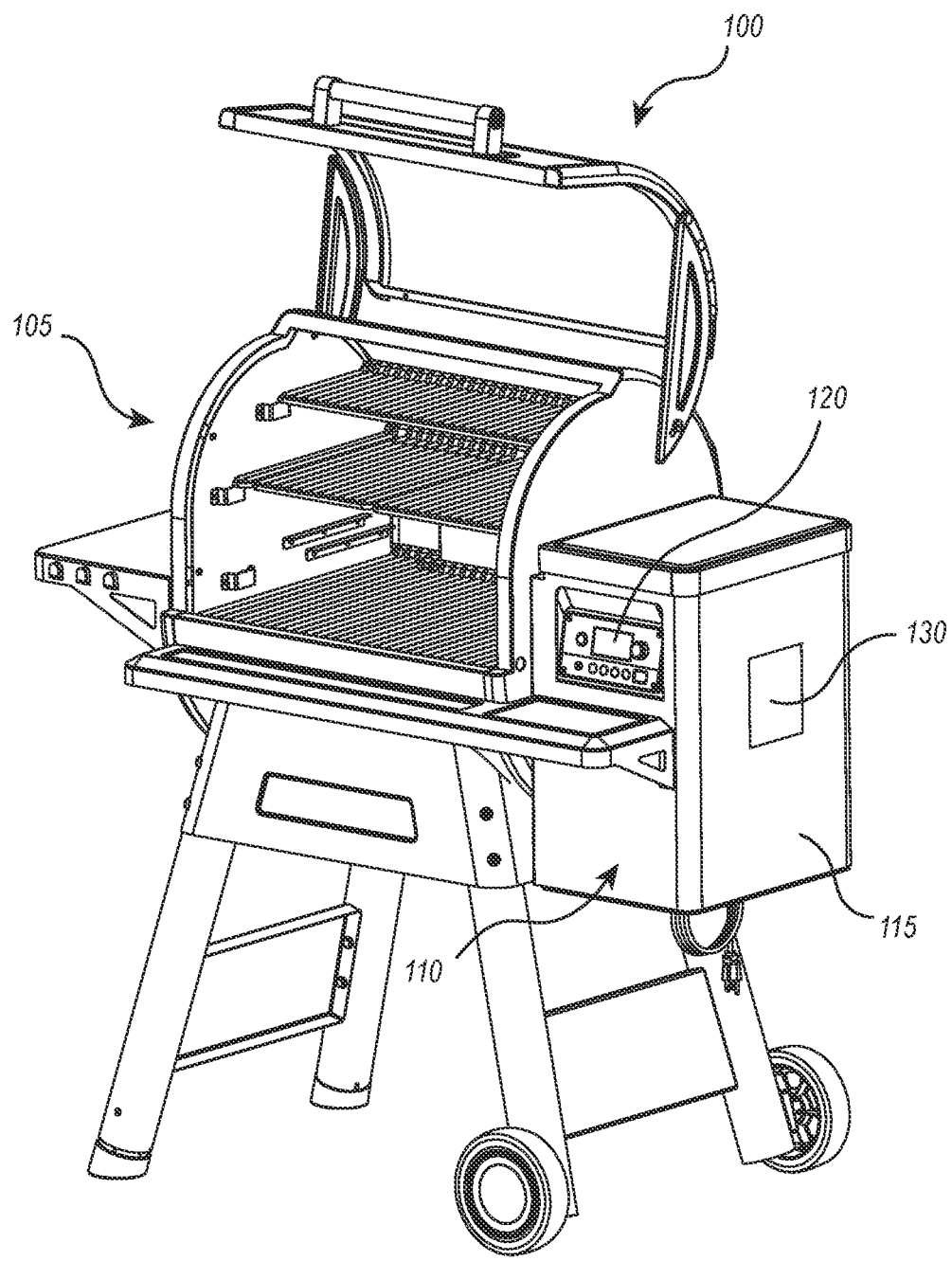
FIG. 1 is an illustration of an embodiment of a solid-fuel grill according to the present disclosure.
Figure 2:
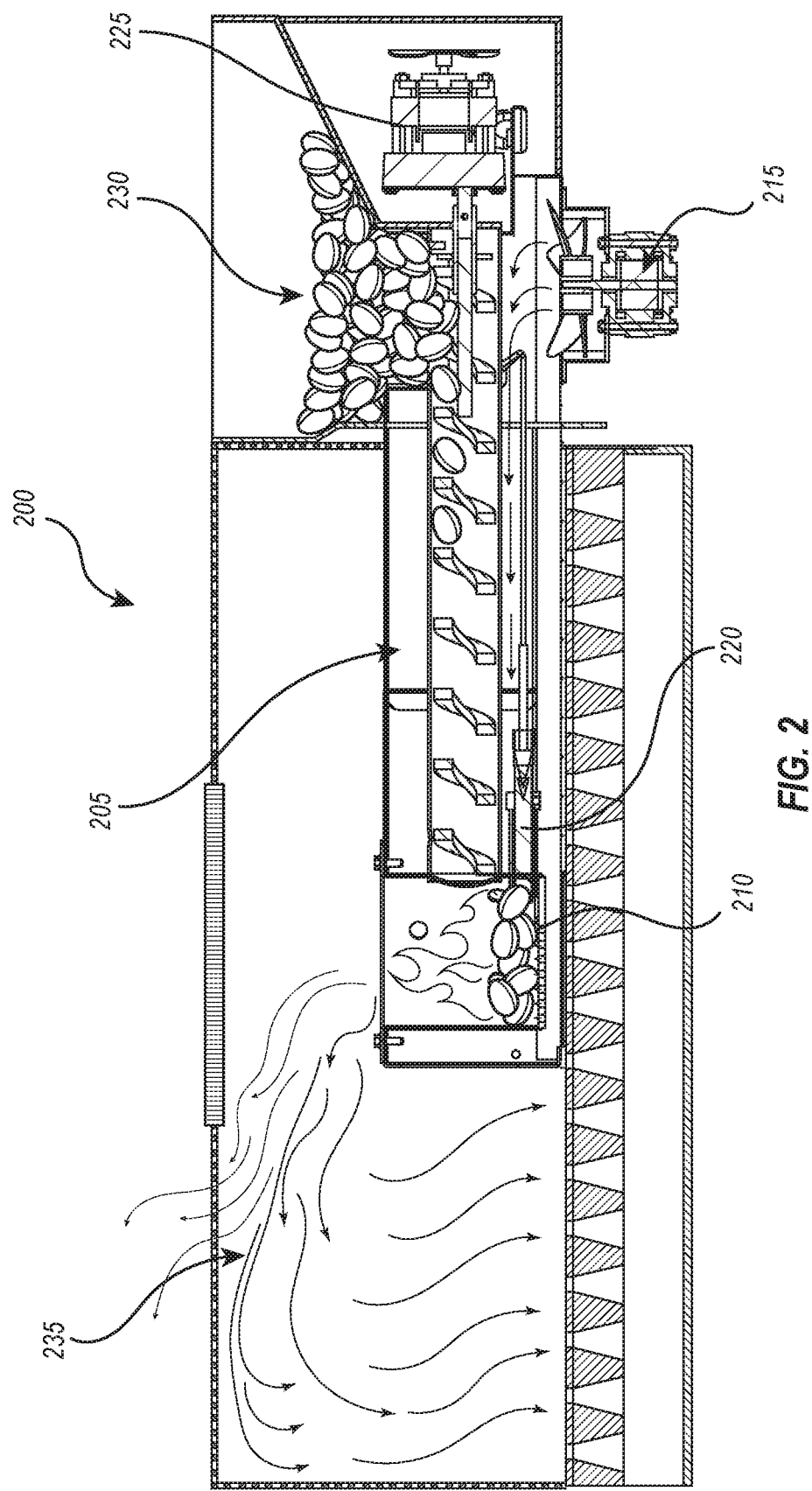
FIG. 2 illustrates an embodiment of an auger feeder system within a solid-fuel grill.

Turning now to the figures, FIG. 1 depicts an embodiment of a solid-fuel grill 100. The solid-fuel grill 100 generally has an upper food-warming/cooking compartment 105 in which a user can prepare food. The solid-fuel grill can also have a lower portion 110 that can house an auger feeder system and a firepot. The lower portion 110 of the solid-fuel grill 100 can also include various other components, such as a blower and hot-rod heating element. FIG. 2 shows the auger/fuel feeder system 200 and firepot 210, as well as the blower motor 215 and hot-rod 220, in more detail below.

Referring to FIG. 1, the solid-fuel grill 100 can also include a hopper 115 and a user control interface 120. A user can open the top portion of the hopper 115 and introduce fuel, such as wood pellets, into the feeder system of the lower portion 110 of the solid-fuel grill 100 through the hopper 115. A user can adjust a control knob, or various other control interface buttons, to adjust a temperature of the food-warming/cooking compartment 105 of the solid-fuel grill 100. While the depicted user control interface 120 is shown as a physical control unit integrated into the solid-fuel grill, in at least one embodiment, the user control interface 120 may additionally or alternatively comprise a computer-based interface on a device, such as a mobile phone, that is wirelessly connected to the solid-fuel grill 100 through a network connection. As such, as used herein the user control interface 120 comprises any interface through which the user can control the solid-fuel grill 100.

The DC solid-fuel grill 100 can also include a DC power source 130. In the depicted embodiment of a solid-fuel grill 100, the DC power source 130 comprises a lithium-ion battery that attaches to the solid-fuel grill 100. The battery may be removable or non-removable. Other embodiments can include other DC power sources 130. For example, one embodiment can include one or more alkaline batteries, lead-acid batteries, lithium-ion batteries, solar panels, a peltier plate, a rectifier, or any other type of DC power storage source. A manufacturer can dispose the DC power source 130 at various locations within or on the outside of the solid-fuel grill 100. The DC power source 130 may be connected to a conventional AC power cord that is capable of charging the DC power source 130. Additionally, the DC power source 130 can power the various components of the solid-fuel grill 100, including but not limited to, a user control interface 120 display and one or more DC motors that actuate the auger, blower, and/or hot-rod heating element.

FIG. 2 illustrates an embodiment of an auger/fuel feeder system 200 within the solid-fuel grill 100 shown in FIG. 1, including an auger 205, firepot 210, blower motor 215, and hot-rod 220. A DC auger motor 225 can engage the auger 205 and rotate the auger 205. A manufacturer can dispose the firepot 210 at the end of the auger 205 to receive fuel pellets into the firepot 210 through an opening in the side of the firepot 210. The hot-rod 220 can also be disposed at or near the firepot 210. A manufacturer can dispose the blower motor 215 at or near the lower portion 110 of the solid-fuel grill 100 so that the blower motor 215 blows air throughout the lower portion 110 and over and/or around the hot-rod 220 and firepot 210. In this way, the blower motor 215 can aid in the combustion of the fuel inside the firepot 210 by providing oxygen to the firepot 210.

To more clearly explain how the system operates, FIG. 2 illustrates an embodiment of an auger/fuel feeder system 200 in use. In this particular embodiment, a user can feed the fuel pellets 230 into the auger 205 via a hopper 115. The DC auger motor 225 can engage the auger 205 and rotate the auger 205. As a result, the rotating auger 205 can feed the fuel pellets 230 into the firepot 210 for combustion, which produces heat and smoke 235.

In at least one embodiment, the blower motor 215 blows air over the hot-rod 220 and into the firepot 210 where the fuel pellets 230 reside. The DC power source 130 can power the hot-rod 220 so that the hot-rod 220 heats up due to the electrical resistance of the hot-rod 220 and combusts fuel inside the firepot 210. Additionally, the blower motor 215 can blow air over the heated hot-rod 220 and into the firepot 210. As a result, the hot-rod 220 heats the air as it passes over the hot-rod 220 and the heated air ignites the fuel pellets 230 residing inside the firepot 210. Once sufficiently heated, the fuel pellets 230 produce heat and smoke 235 that rises to warm/heat the heating/grilling surface of the solid-fuel grill 100.

As discussed above, in at least one embodiment, the DC power source 130 can power a DC motor, such as the DC auger motor 225. A user can cause the auger motor 225 to actuate at a negative velocity, such that DC auger motor 225 operates in reverse. For example, the user may switch the DC power source 130 to the auger motor 225 in a first polarity so that the auger motor 225 rotates the auger 205 in a first direction. The auger 205 can feed the fuel pellets 230 into the firepot 210 when the auger 205 rotates in this first direction. Alternatively, a user can switch polarity of the DC power source 130 so that the auger motor 225 operates according to a second polarity, which is opposite the first polarity. The second polarity can cause the auger motor 225 to rotate in a second direction, which is the opposite of the first direction, and cause the auger 205 to draw fuel pellets 230 away from the firepot 210.

In at least one embodiment, a user can cause the auger motor to reverse direction by directly or indirectly actuating an electric switch. The electric switch may comprise, at least in part, a mechanical switch that causes the DC power source 130 to mechanically connect differently to the auger motor 225. Alternatively, the electric switch may comprise a DC controller (not shown). The DC controller may comprise a microprocessor that is capable of sending commands to the auger motor 225. The DC controller may also or alternatively include a voltage controller that is configured to selectively adjust the level of DC voltage applied to an auger motor 225. Additionally or alternatively, in at least one embodiment, the DC controller is physically integrated within the auger motor 225. One will appreciate that while the above example is provided with respect to the auger motor 225, in additional or alternative embodiments, a DC controller may similarly operate with any number of different DC motors, such as, but not limited to, the blower motor 215.

Figure 3:
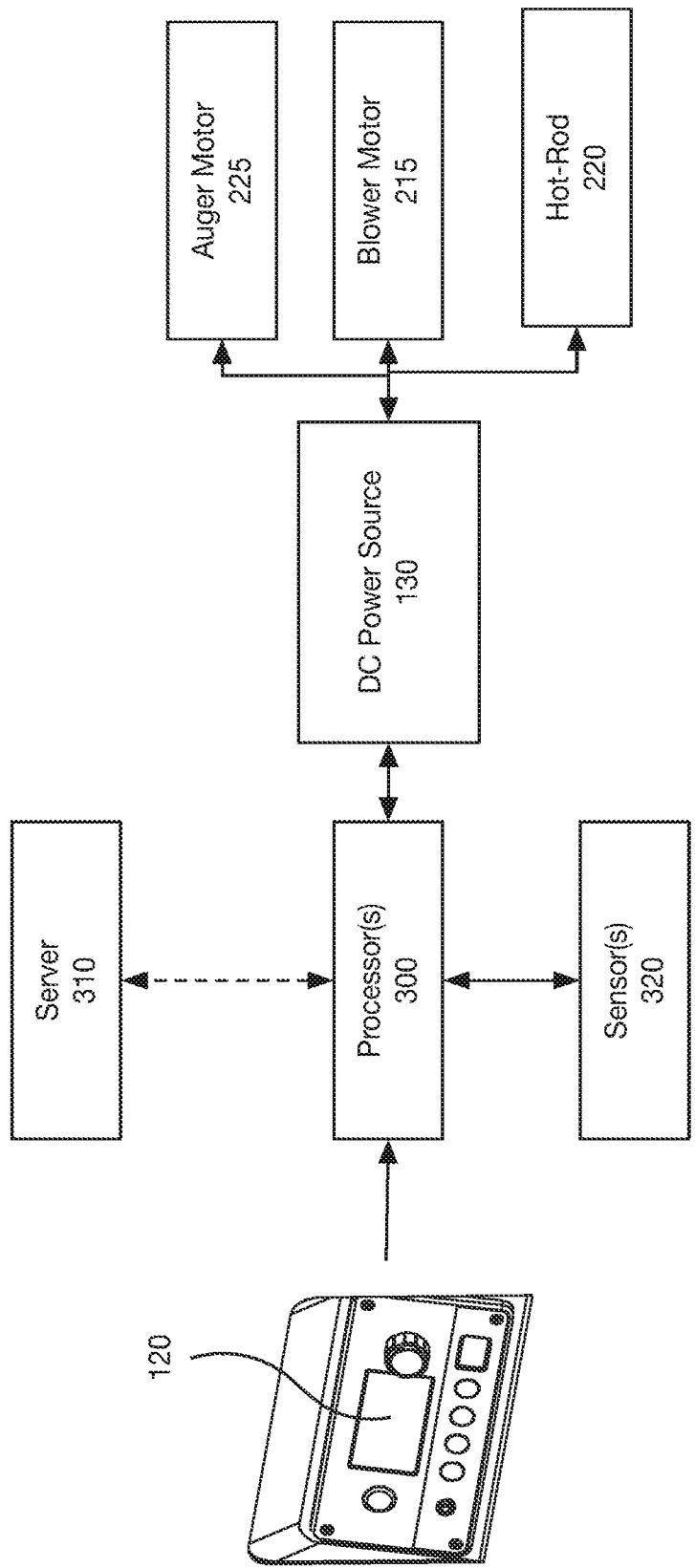
FIG. 3 illustrates a schematic representation of a control system of a solid-fuel grill.

FIG. 3 illustrates a schematic diagram of electrical components within a DC-powered, solid-fuel grill 100. In particular, FIG. 3 illustrates an embodiment of a user control interface 120 in communication with one or more processors 300 within a solid-fuel grill 100. The one or more processors 300 may further be in communication with a server 310, one or more sensors 320, and a DC power source 130. In at least one embodiment, the DC power source 130 comprises a DC controller, such as a microprocessor, that is in communication with the one or more processors 300.

In at least one embodiment, the DC power source 130 is further in communication with an auger motor 225, a blower motor 215, and/or a hot-rod 220. Each of the auger motor 225, the blower motor 215, and/or the hot-rod 220 may comprise a DC controller for detecting and/or adjusting the operating characteristics of the respective solid-fuel grill components. For example, the auger motor 225 may comprise a DC controller that is capable of adjusting and monitoring the speed of rotation of the auger, the direction of rotation of the auger, and various other similar characteristics.

In at least one embodiment, a user can monitor and/or control various characteristics of the DC power source 130 and/or solid-fuel grill components from the user control interface 120. For example, a user may communicate through the user control interface 120 to adjust a temperature within the solid-fuel grill 100. In response to receiving the communication, a DC controller may communicate a first signal to the DC auger motor 225. The first signal causes the DC auger motor to actuate at a first velocity. The first velocity may comprise a high rate of actuation such that fuel pellets 230 are quickly fed into the firepot 210. One will appreciate that the added fuel can increase the heat generated by the combustion of the fuel pellets 230.

Once one or more sensors 320 within the solid-fuel grill 100 detect that a measured temperature is reaching the target temperature, the DC controller may communicate a second signal to the DC auger motor 225. The second signal causes the auger motor 225 to actuate at a second velocity. The second velocity may comprise a relatively lower rate of actuation such that the fuel pellets 230 are fed into the firepot 210 at a slower rate. This slower rate may be configured to maintain the temperature of the solid-fuel grill 100 without causing the temperature to continue rising.

As a further example of a DC controller adjusting the characteristics of a solid-fuel grill component, fuel pellets 230 can sometimes jam or clog the auger 205 if too many fuel pellets are introduced into the auger 205 or if one or more fuel pellets 230 lodges between the auger 205 and the housing surrounding the auger 205. In at least one embodiment, a DC controller can detect the operating characteristics of the auger motor 225, including whether a clog is present. For example, the DC auger motor 225 may communicate an error signal to a DC controller indicating that the auger 205 is not properly rotating. The error signal may comprise an indication that the DC controller is commanding the auger motor 225 to rotate at a first velocity, but instead the auger motor 225 is only capable of rotating at a second, slower velocity. Additionally or alternatively, one or more sensors 320 may detect that the temperature within the solid-fuel grill 100 is dropping despite the continued rotation of the auger 205 and the high temperature of the hot-rod 220.

When a clog is detected, a user through the user control interface 120 or the solid-fuel grill automatically can reverse the auger 205 to draw the fuel pellets 230 away from the firepot 210 and readjust the position of jammed fuel pellets 230. For example, under normal operating conditions a DC controller can send a first signal to the DC auger motor 225 causing the auger 205 to actuate at a first velocity. Upon detecting the clog, the DC controller can send a second signal to the DC auger motor 225 causing the auger 205 to actuate at a second velocity, which is a negative velocity, such that the auger 205 reverses directions. Once the clog has been cleared, or after a threshold amount of time, the DC controller can communicate a third signal to the DC auger motor 225 causing the auger 205 to actuate at a positive velocity.

The actual control of the auger motor 225 may be performed by the one or more processors 300 and/or a DC controller associated with the auger motor 225. For instance, in at least one embodiment, the DC controller may be software commands executed by the one or more processors 300, such that the one or more processors 300 only need to communicate pre-determined commands through the DC controller in order to cause the DC controller to operate in a number of different ways. Alternatively, the DC controller may comprise physical circuitry integrated within the one or more processors 300, integrated within the auger motor 225, or integrated into a stand-alone processing module. One will appreciate that while the disclosed example was provided with respect to the auger 205 and auger motor 225, in additional or alternative embodiments, any solid-fuel grill components can be similarly controlled.

For example, in at least one embodiment, a manufacturer can also connect the blower motor 215 to the DC power source 130 so that blower motor 215 can reverse direction as well. The blower motor 215 may also be in communication with a DC controller that allows the one or more processors 300 to control the velocity and direction of the blower motor 215. For instance, the ability to reverse the direction of a blower motor 215 provides several benefits over conventional systems. For example, ash produced from spent fuel pellets 230 can accumulate within the firepot 210 or elsewhere within the solid-fuel grill 100 due to fuel combustion in the firepot 210 and air circulation from the blower motor 215. Accumulated ash can reduce burning efficiency and otherwise negatively affect the grilling device. To help clear out ash from the firepot 210 and other areas of the grilling device, a user can reverse the direction of the blower motor 215 to create a suction within the grilling device. To aid in the cleaning, a manufacturer of the solid-fuel grill 100 can provide perforations in the firepot 210, or other holes in the grilling device, through which a user can draw out accumulated ash from the solid-fuel grill 100.

FIG. 2 illustrates a cross-sectional view of an embodiment of a firepot 210 with a hot-rod 220 extending therein. In one implementation, the hot-rod 220 extends into the firepot 210 to make direct contact with the fuel pellets 230 residing within the firepot 210. In this embodiment, the hot-rod 220 can ignite the fuel pellets 230 within the firepot 210, by conductive heat transfer between the fuel pellets 230 and the hot-rod 220. Additionally or alternatively, the blower motor 215 can blow air over the hot-rod 220 and into the firepot 210 to ignite the fuel pellets 230 through convective heat transfer.

The hot-rod 220 can comprise ceramic material and two or more electrical leads. In particular, a manufacturer can connect the DC power source 130 to the leads of the hot-rod 220 and provide the hot-rod 220 with electrical current. The DC power source 130 passes current through the hot-rod 220 and the electrical resistance of the hot-rod 220 causes the ceramic material to heat up. One advantage of ceramic material is that ceramics can change temperature at a faster rate than some other materials used in hot-rods of the prior art. Also, ceramic material is very durable and more corrosion resistant than hot-rods of other materials found in the prior art, such as metal.

It will be appreciated, however, that in one or more embodiments, a manufacturer can include a hot-rod 220 comprising materials other than ceramic materials. For example, a manufacturer can include a stainless steel hot-rod or hot-rods comprised of other heat-conducting materials. A manufacturer can include a stainless steel hot-rod for ignition of fuel pellets 230 in the firepot 210 through conductive heat transfer, as described above. Also, a manufacturer can include a ceramic hot-rod for ignition of fuel pellets 230 in the firepot 210 through conductive heat transfer, convective heat transfer, or both. Additionally or alternatively, in at least one embodiment, the hot-rod 220 may comprise a gas ignition system that comprises a gas flame emitting from the hot-rod 220 in order to ignite fuel pellets 230.

In at least one embodiment, the user can adjust the temperature of the solid-fuel grill 100 by adjusting the level of current that the DC power source 130 provides to the hot-rod 220. The user can adjust the temperature by manipulating a button, switch, and/or knob on the user control interface 120. In this vein, FIG. 3 illustrates an embodiment of a user control interface 120 that includes a temperature adjustment knob and a display screen. The display screen can display information to the user, such as, but not limited to, a set temperature of the grill, an actual temperature of the grill, elapsed time, or any other information that aids the user in cooking food in the solid-fuel grill 100. One will appreciate that other embodiments of a user control interface 120 can include more than one display screen or no display screens, as well as any number and combination of buttons, knobs, switches, and the like, that a user can use to adjust the temperature of the solid-fuel grill 100. A user can manipulate the various buttons, knobs, and/or switches mechanically or electronically through touch-screen technology or remotely through a computing system, such as a mobile phone.

Returning to FIG. 3, in at least one embodiment, the user control interface 120 outputs a signal to the one or more processors 300. The one or more processors 300 can utilize one or more DC controllers to adjust the amount of current that the DC power source 130 supplies to the auger motor 225. As the DC power source 130 supplies more power to the auger motor 225, the rotational speed of the auger 205 increases, feeding more fuel pellets 230 into the firepot 210. The increased rate of fuel pellets 230 increases the heat produced in the firepot 210, thus increasing the temperature of the solid-fuel grill 100.

In at least one embodiment, the one or more DC controllers can also operate the blower motor 215 such that as the auger 205 increases the feed rate of fuel pellets 230 into the firepot 210, the blower motor 215 also increases speed in order to provide more oxygen to the resulting combustion.

Additionally or alternatively, the one or more DC controllers can cause the blower motor 215 and the auger motor 225 to alternate actuations. In some cases, actuating both the blower motor 215 and the auger motor 225 simultaneously can cause the DC power source 130 to drain quickly. As such, alternating the blower motor 215 and the auger motor 225 can reduce the drain of the DC power source 130.

In another embodiment, the solid fuel grill can also include one or more sensors 320. The one or more sensors 320 can include temperature sensors that the manufacturer can dispose within the food-warming/cooking compartment 105 of the solid-fuel grill 100. In some embodiments, the manufacturer can dispose the one or more sensors 320 in the firepot 210 to measure the temperature within the firepot 210 during use. In some embodiments, the one or more sensors 320 can sense the temperature of the solid-fuel grill 100 and relay the temperature information to the one or more processors 300 in order to implement proportional, derivative, and/or integral temperature control algorithms.

Additionally, in at least one embodiment, a user can use the hot-rod 220 as a sensor. For example, the one or more processors 300 (FIG. 3) can shut off power to the hot-rod 220 completely and the temperature of the hot-rod 220 can produce a current that the electrical leads relay back to the one or more processors 300. The magnitude of the current produced by the hot-rod 220 can indicate the temperature of the hot-rod 220 and the firepot 210 in which the hot-rod 220 is disposed. The manufacturer can substantially reduce a temperature adjustment lag-time and produce a cold, good tasting smoke by using the hot-rod 220 as a sensor.

For example, combustion of fuel pellets within the firepot 210 may comprise four stages. Within the first stage, the hot-rod 220 heats up and the blower motor 215 actuates air into the firepot 210 causing moisture to evaporate out of the fuel pellets 230. During the second state, the hydro-carbons within the fuel pellets 230 vaporize. During this state, the desirable smoke is produced. Using convention systems, it is extremely challenging or impossible to effectively establish and prolong this state. In particular, the following third stage is gas vapor ignition where the actual flames appear. As such, to prolong the production of smoke by the fuel pellets 230 it is necessary to first reach a desired temperate within the firepot 210 and then to prevent the fuel pellets 230 from fully catching fire.

In at least one embodiment, a DC solid-fuel grill 100 provides several technical solutions to this particular problem. For example, using a DC power source 130 and DC motors, the DC solid fuel grill is capable of achieving much greater resolution and control over the different solid-fuel grill components. For example, during the second stage of combustion, the solid-fuel grill 100 can control the temperature of the hot-rod 220, the amount of air pushed by the blower motor 215, and the speed at which the auger 205 delivers fuel pellets 230 to the firepot 210. For example, within a conventional grill, it may take up to four-minutes or more for the temperature of the food-warming/cooking compartment 105 to heat up to the desired temperature and for the one or more sensors 320 to relay that information back to the one or more processors 300 for temperature adjustment and control. Within that time, the fuel pellets 230 can produce an unwanted hot flame before the auger 205 slows down to reduce the temperature.

In at least one embodiment, a DC solid-fuel grill 100 is capable of much greater control over the solid-fuel grill components. For example, the hot-rod 220 can serve as a sensor as described above. In such an embodiment, the hot-rod 220, which the manufacturer can place in close proximity to, or in direct contact with, the combusting fuel pellets 230, can sense the temperature in the firepot 210 as soon as combustion of the fuel pellets 230 produces a hot flame. The hot-rod 220 can then send an electrical signal representing the temperature back to the processor. In turn, the processor can then vary the power given to the auger motor 225 and the blower motor 215 in reaction to the received sensor information.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
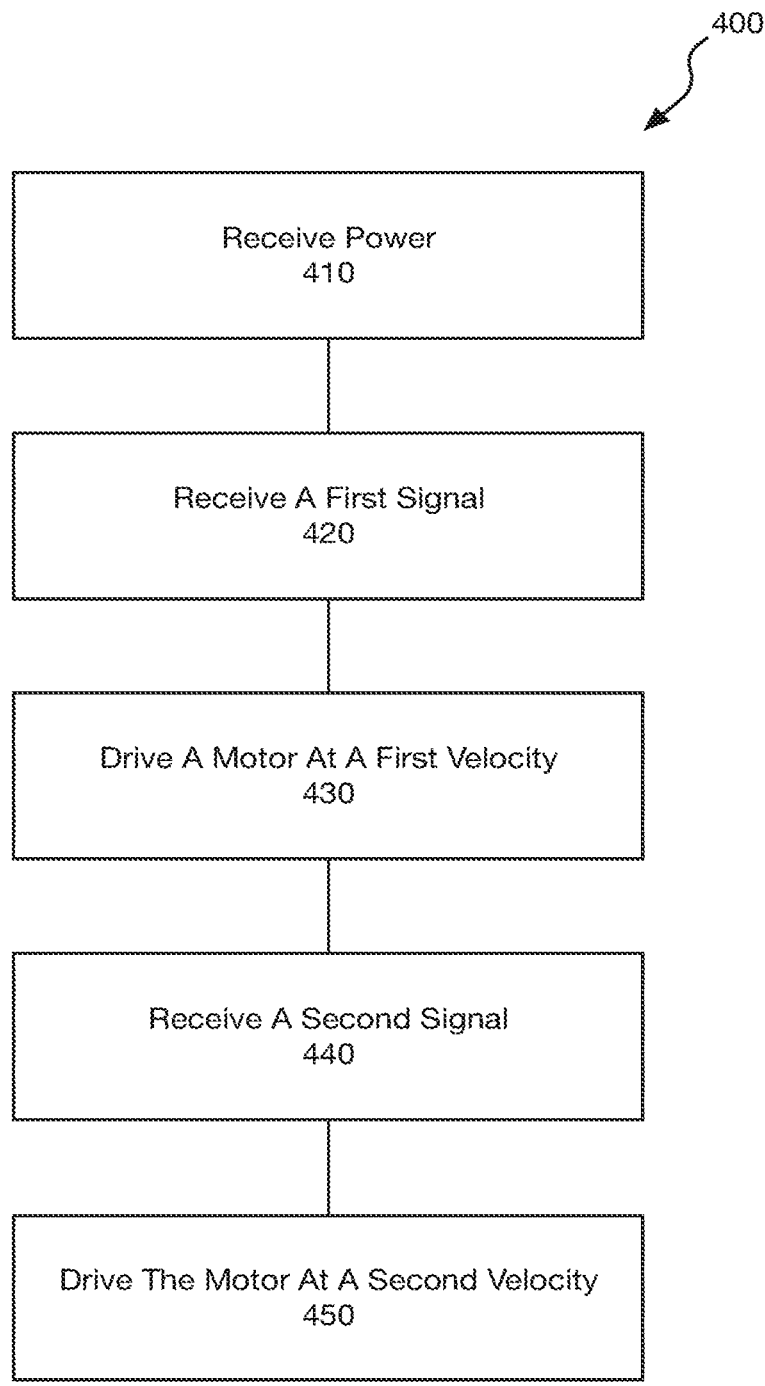
FIG. 4 illustrates a schematic representation of a method of operating a DC solid-fuel grill.

FIG. 4 illustrates various steps in a flowchart for a method 400 of operating a DC solid-fuel grill 100. The method 400 includes an act 410 of receiving power. Act 410 comprises receiving, at a DC auger motor 225, power from a DC power source 130. For example, as depicted and described with respect to FIGS. 2 and 3, an embodiment of a solid-fuel grill 100 may comprise various DC motors, including an auger motor 225 and a blower motor 215. The DC motors 225, 215 may be powered by a DC power source 130, such as a battery, a rectifier, a solar panel, or any other DC power source.

Method 400 also includes an act 420 of receiving a first signal. Act 420 comprises receiving, from a DC controller, a first signal to actuate the DC auger motor 225, wherein the first signal causes the DC auger motor 225 to actuate at a first velocity. For example, as depicted and described with respect to FIGS. 2 and 3, a DC controller can send a signal to the auger motor 225 to rotate at a first velocity in order to feed fuel pellets 230 into the firepot 210 at a desired rate.

Additionally, method 400 includes an act 430 of driving a motor at a first velocity. Act 420 comprises driving, with the DC auger motor 225, a solid-fuel grill component (e.g., the auger 205) at the first velocity. For example, as depicted and described with respect to FIGS. 2 and 3, the DC auger motor 225 can be configured to actuate the auger 205 at a particular first velocity in order to feed fuel pellets 230 into the firepot 210 at a desired rate.

Method 400 includes an act 440 of receiving a second signal. Act 440 comprises receiving, from a DC controller, a second signal to actuate the DC auger motor 225, wherein the second signal causes the DC auger motor 225 to actuate at a second velocity. For example, as depicted and described with respect to FIGS. 2 and 3, a DC controller can send a signal to the auger motor 225 to rotate at a second velocity in order to slow the rate at which fuel pellets 230 are fed into the firepot 210 or to reverse the direction of the auger 205 in order to remove a clog.

Further, method 400 includes an act 450 of driving a motor at a second velocity. Act 450 comprises driving, with the DC auger motor 225, a solid-fuel grill component (e.g., the auger 205) at the second velocity. For example, as depicted and described with respect to FIGS. 2 and 3, the DC auger motor 225 can be configured to actuate the auger 205 at a second velocity in order to slow the rate at which fuel pellets 230 are fed into the firepot 210 or to reverse the direction of the auger 205 in order to remove a clog.

Accordingly, a DC solid-fuel grill 100 provides several advantages over the art. For example, a DC powered grill is able to drive DC motors without the need for inverters. Additionally, the DC motors are able to easily reverse direction and rotate at a wide variety of different selectable speeds. Further, the DC motor is able to enter into low-power modes. Such modes may be beneficial when a DC power supply, such as a battery, is running low on power or when the supply of fuel pellets 230 within the hopper 115 runs low.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS")), and deployment models (e.g., private cloud, community cloud, public cloud, hybrid cloud, etc.).

Cloud and remote based service applications are prevalent. Such applications are hosted on public and private remote systems such as clouds and usually offer a set of web-based services for communicating back and forth with clients.

Many computers are intended to be used by direct user interaction with the computer. As such, computers have input hardware and software user interfaces to facilitate user interaction. For example, a modern general-purpose computer may include a keyboard, mouse, touchpad, camera, etc., for allowing a user to input data into the computer. In addition, various software user interfaces may be available.

Examples of software user interfaces include graphical user interfaces, text command line-based user interface, function key or hot key user interfaces, and the like.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the disclosure can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium that can be used to store desired program code means in the form of computer-executable instructions or data structures and that can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links that can be used to carry program code in the form of computer-executable instructions or data structures, and that can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data that cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

This disclosure may be embodied in other specific forms without departing from its spirit or characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A direct-current solid-fuel grill comprising:
a direct-current power source;
a direct-current motor receiving power from the direct-current power source;
a solid-fuel grill component configured to be driven by the direct-current motor;
a heating element configured to provide a temperature reading when the heating element is not powered; and
a direct-current controller in communication with the heating element and the direct-current motor, wherein the direct-current controller is configured to:
provide a first signal to the direct-current motor causing the solid-fuel grill component to actuate at a first velocity;
provide a second signal to the direct-current motor causing the solid-fuel grill component to actuate at a second velocity;
provide a third signal to the heating element; and
terminate the third signal from the heating element and receive the temperature reading from the heating element when the third signal is terminated.

2. The direct-current solid-fuel grill of claim 1, wherein the solid-fuel grill component comprises a blower.

3. The direct-current solid-fuel grill of claim 1, wherein the solid-fuel grill component comprises a solid-fuel auger.

4. The direct-current solid-fuel grill of claim 1, wherein the first velocity comprises a positive velocity and the second velocity comprises a negative velocity.

5. The direct-current solid-fuel grill of claim 1, wherein the direct-current power source comprises a solar panel.

6. The direct-current solid-fuel grill of claim 1, wherein the direct-current power source comprises a removable battery.

7. The direct-current solid-fuel grill of claim 1, wherein the direct-current controller comprises a microprocessor.

8. The direct-current solid-fuel grill of claim 1, wherein the direct-current controller comprises a voltage controller.

9. The direct-current solid-fuel grill of claim 1, wherein the direct-current controller identifies operating characteristics of the solid-fuel grill component.

10. A method for operating a direct-current solid-fuel grill, the method comprising:
receiving, at a direct-current motor, power from a direct-current power source;
receiving, from a direct-current controller, a first signal to actuate the direct-current motor, wherein the first signal causes the direct-current motor to actuate at a first velocity;
driving, with the direct-current motor, a solid-fuel grill component at the first velocity;

receiving at least one of a velocity measurement from the direct-current motor and a temperature measurement from a temperature sensor;

determining that solid fuel being fed by a solid-fuel auger has clogged based on at least one of the velocity measurement and the temperature measurement;

in response to determining that solid fuel being fed by the solid-fuel auger has clogged, receiving, from the direct-current controller, a second signal to actuate the direct-current motor, wherein the second signal causes the direct-current motor to actuate at a second velocity and the second velocity is a negative velocity such that the solid-fuel auger reverses direction; and driving, with the direct-current motor, the solid-fuel grill component at the second velocity.

11. The method of claim 10, wherein the solid-fuel grill component comprises a blower.

12. The method of claim 10, wherein the solid-fuel grill component comprises the solid-fuel auger.

13. The method of claim 10, wherein the first velocity comprises a positive velocity and the second velocity comprises a negative velocity.

14. The method of claim 10, wherein the direct-current power source comprises a solar panel.

15. The method of claim 10, wherein the direct-current power source comprises a removable battery.

16. The method of claim 10, wherein the direct-current controller comprises a microprocessor.

17. The method of claim 10, wherein the direct-current controller comprises a voltage controller.

18. The method of claim 10, wherein the direct-current controller identifies operating characteristics of the solid-fuel grill component.

19. A direct-current solid-fuel grill comprising:
a direct-current power source;
a first direct-current motor receiving power from the direct-current power source;
a solid-fuel auger configured to be actuated by the first direct-current motor; and
a second direct-current motor receiving power from the direct-current power source;
a blower configured to be actuated by the first direct-current motor; and
a direct-current controller in communication with the first direct-current motor and the second direct-current motor, wherein the direct-current controller is configured to:
provide a first signal to the first direct-current motor and a third signal to the second direct-current motor causing the solid-fuel auger to actuate at a first velocity and the blower to actuate at a third velocity;
provide a second signal to the at least one of the first direct-current motor or the second direct-current motor causing the at least one of the solid-fuel auger or the blower to actuate at a second velocity; and
alternate the first signal and the third signal, such that the solid-fuel auger and the blower are not operating at the first velocity and the third velocity at a same time.

* * * * *